United States Patent
Takezoe et al.

(10) Patent No.: US 7,826,510 B2
(45) Date of Patent: Nov. 2, 2010

(54) LASER OSCILLATION ELEMENTS

(75) Inventors: Hideo Takezoe, Tokyo (JP); Junji Watanabe, Tokyo (JP); Myoung Hoon Song, Tokyo (JP); Byoungchoo Park, Tokyo (JP); Ki-Chul Shin, Tokyo (JP); Takehiro Toyooka, Yokohama (JP); Suzushi Nishimura, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 658 days.

(21) Appl. No.: 10/575,238

(22) PCT Filed: Oct. 8, 2004

(86) PCT No.: PCT/JP2004/014957

§ 371 (c)(1),
(2), (4) Date: Feb. 21, 2007

(87) PCT Pub. No.: WO2005/036704

PCT Pub. Date: Apr. 21, 2005

(65) Prior Publication Data

US 2007/0165687 A1     Jul. 19, 2007

(30) Foreign Application Priority Data

| Oct. 10, 2003 | (JP) | P2003-352809 |
| Oct. 10, 2003 | (JP) | P2003-352830 |
| Jan. 13, 2004 | (JP) | P2004-005927 |
| Jan. 13, 2004 | (JP) | P2004-005932 |

(51) Int. Cl.
    *H01S 3/20* (2006.01)
(52) U.S. Cl. .......................... 372/51; 372/53
(58) Field of Classification Search ............... 372/53, 372/51, 94, 49; 257/80
See application file for complete search history.

(56) References Cited

U.S. PATENT DOCUMENTS 6,396,859 B1    5/2002    Kopp et al.

(Continued)

FOREIGN PATENT DOCUMENTS

JP      06-318766      11/1994

(Continued)

OTHER PUBLICATIONS

Kopp, V. I., et al., "Twist Defect in Chiral Photonic Structures," *Phys. Rev. Ltrs.*, vol. 89, No. 3 (Jul. 15, 2002), pp. 033901-1-033901-4.

(Continued)

*Primary Examiner*—Minsun Harvey
*Assistant Examiner*—Tuan N. Nguyen
(74) *Attorney, Agent, or Firm*—Finnegan, Henderson, Farabow, Garrett & Dunner, LLP

(57) ABSTRACT

A laser oscillation element 1 according to the invention comprises a cholesteric liquid crystal layer 2 containing cholesteric liquid crystals, a cholesteric liquid crystal layer 3 containing cholesteric liquid crystals facing the cholesteric liquid crystal layer 2, and a defect layer 4 containing a dye 5 which emits fluorescence upon optical excitation disposed between the cholesteric liquid crystal layers 2, 3. A selective reflection wavelength band in the cholesteric liquid crystals overlaps with the emission band of the fluorescence emitted by the dye 5, the helical winding directions of the cholesteric liquid crystals contained in the cholesteric liquid crystal layers 2, 3 are identical, and the transition moments of the dye 5 are aligned parallel to the surfaces of the cholesteric liquid crystal layers 2, 3. According to the laser oscillation element 1, a laser oscillation can be generated with high efficiency. Moreover, continuous wave lasing can be generated.

16 Claims, 6 Drawing Sheets

U.S. PATENT DOCUMENTS

| | | | |
|---|---|---|---|
| 7,335,921 B2* | 2/2008 | Magn et al. | 257/80 |
| 2002/0118710 A1* | 8/2002 | Kopp et al. | 372/7 |
| 2002/0131707 A1* | 9/2002 | Kopp et al. | 385/37 |

FOREIGN PATENT DOCUMENTS

| | | |
|---|---|---|
| JP | 2002-536827 | 10/2002 |
| JP | 2005-172876 | 6/2005 |
| WO | WO 03/096757 A1 | 11/2003 |

OTHER PUBLICATIONS

International Search Report.

Ozaki, R., et al., "Optical Properties and Laser Action in One-dimensional Periodic Dielectrics Containing Liquid Crystal as Defect Layer," *Proc. 7th Intl. Conf. Properties & Applns. of Dielectric Materials*, Jun. 1-5, 2003, pp. 528-531.

Kopp, V. I., "Low-threshold lasing at the edge of a photonic stop band in cholesteric liquid crystals," *Optics Letters*, vol. 23, No. 21 (Nov. 1, 1988), pp. 1707-1709.

Ozaki, M., et al., "Defect Mode within Stop Band of Cholesteric Liquid Crystal and Laser Action," *J. Soc. Elect. Mat. Eng.*, vol. 11, No. 2 (2002), pp. 164-167.

Zhu Z., et al., "Conjugated Polymer Liquid Crystal Solutions: Control of Conformation and Alignment," *J. Am. Chem. Soc.*, 2002, 124, 9670-9671.

Song, Myoung Hoon et al., "Polarization Characteristics of Phase Retardation Defect Mode Lasing in Polymeric Cholesteric Liquid Crystals," Science and Technology of Advanced Materials, vol. 5, pp. 437-441; 2004.

Song, Myoung Hoon et al., "Effect of Phase Retardation on Defect-Mode Lasing in Polymeric Cholesteric Liquid Crystals," Adv. Mater., vol. 16, No. 9-10, pp. 779-783, 2004.

Ozaki, Ryotaro et al., "Electrically Color-Tunable Defect Mode Lasing in One-Dimensional Photonic-Band-Gap System Containing Liquid Crystal," Applied Physics Letters, vol. 82, No. 21 pp. 3593-3595, 2003.

European Search Report dated Jul. 27, 2007.

Hiroyuki T. et al., "Characteristics of Resonator using Cholesteric Liquid Crystal", Tokyo Univ. of Agri. & Tech., Mar. 27, vol. 50, No. 3, The Japan Society of Applied Physics and related Societies, 2003, 1368-0.

* cited by examiner (a)

(b)

(c)

LASER OSCILLATION ELEMENTS

TECHNICAL FIELD

This invention relates to a laser oscillation element using cholesteric liquid crystals.

BACKGROUND ART

Cholesteric liquid crystals have the property of selectively reflecting light of a specific wavelength, and in particular, they selectively reflect circularly polarized light in the same rotation direction as, and transmit circularly polarized light in the opposite direction to, the helical winding direction of the cholesteric liquid crystals.

In this type of cholesteric liquid crystal, in the prior art, it was reported that laser oscillation occurs at the edge of the selective reflection wavelength band (e.g., Non-patent document 1).

Recently, it has been proposed that in order to attain the laser oscillation with low-threshold value, the laser oscillation should be generated at a wavelength inside the selective reflection wavelength band, and various research has been pursued regarding laser oscillation elements which could generate this laser oscillation. A known example of such a laser oscillation element comprises two cholesteric liquid crystal films containing a dye or pigment (hereinafter "dye") superimposed with different azimuth angles (e.g., Non-patent document 2).

Non-patent document 1: Kopp et al (4 others), "Low-threshold lasing at the edge of a photonic stop band in cholesteric liquid crystals", Optics Letters, USA, 1998, Volume 23, p. 1707-1709.

Non-patent document 2: Ozaki et al (3 others), "Defect modes and laser oscillation in the stop band of cholesteric liquid crystals", Journal of the Society of Electrical Materials Engineering, 2002, Volume 11 No. 2, page 165-167.

DISCLOSURE OF INVENTION

Problems which this Invention Aims to Solve

The Inventors discovered that, in the laser oscillation element described in Non-patent document 2, although a laser oscillation could be generated at a wavelength within the selective reflection band, the thickness of the laser oscillation element had to be considerably increased to obtain a laser light of sufficient intensity. In other words, the Inventors discovered that in prior art laser oscillation elements, a laser oscillation could not be generated with high efficiency.

It is therefore an object of the present invention to provide a laser oscillation element which can generate a laser oscillation with high efficiency.

Means to Resolve the Above Problems

The Inventors, as a result of intensive studies to solve the above problem, discovered that these problems could be overcome by providing a defect layer with a dye disposed between two cholesteric liquid crystal layers, wherein the transition moments of the dye were parallel to the surfaces of the cholesteric liquid crystal layers, or by providing a defect layer composed of an anisotropic medium disposed between two cholesteric liquid crystal layers, and thereby arrived at the present invention.

The laser oscillation element of the invention specifically comprises a first cholesteric liquid crystal layer containing cholesteric liquid crystals, a second cholesteric liquid crystal layer containing cholesteric liquid crystals facing the first cholesteric liquid crystal layer, and a defect layer containing a dye which emits fluorescence due to optical excitation disposed between the first cholesteric liquid crystal layer and second cholesteric liquid crystal layer. The selective reflection wavelength band in the aforesaid cholesteric liquid crystals and the fluorescence band of fluorescence emitted from the dye overlap with each other in at least a part of the wavelength range, the helical winding directions of the cholesteric liquid crystals in the first cholesteric liquid crystal layer and second cholesteric liquid crystal layer are identical, and the transition moments of the dye are parallel to the surfaces of the first cholesteric liquid crystal layer and second cholesteric liquid crystal layer.

To generate a laser oscillation with this laser oscillation element, light of shorter wavelength than for example the selective reflection wavelength band in the first and second cholesteric liquid crystal layers is used as the dye excitation light. In the laser oscillation element of the invention, the dye excitation light is arranged to be incident on for example the first cholesteric liquid crystal layer. The excitation light then passes through the first cholesteric liquid crystal layer to be incident on the defect layer, where the dye is excited to emit fluorescence and generate a laser oscillation. The laser oscillation element can then generate a laser oscillation with high efficiency. In the laser oscillation element of the invention, continuous wave lasing can also be generated.

Here, the reason why a laser oscillation is generated with high efficiency may be that in the defect layer, the transition moments of the dye are parallel to the surfaces of the first cholesteric liquid crystal layer and second cholesteric liquid crystal layer, so the absorption efficiency of the dye and the efficiency of extracting the fluorescence are very high.

In this invention, the alignment direction and alignment degree of the transition moment may be known by for example measuring the azimuth angle dependency of absorbance of linear polarization which rotates in the direction of the azimuth angle.

In this laser oscillation element, the defect layer may be composed of an anisotropic medium.

Alternatively, the laser oscillation element of the invention comprises a first cholesteric liquid crystal layer containing cholesteric liquid crystals, a second cholesteric liquid crystal layer containing cholesteric liquid crystals facing the first cholesteric liquid crystal layer, and a defect layer composed of an anisotropic medium disposed between the first cholesteric liquid crystal layer and second cholesteric liquid crystal layer. The helical winding directions of the cholesteric liquid crystals in the first cholesteric liquid crystal layer and second cholesteric liquid crystal layer are identical, and a dye which emits fluorescence due to optical excitation is contained in at least one of the first cholesteric liquid crystal layer, the defect layer and the second cholesteric liquid crystal layer. The selective reflection wavelengths bands in the first cholesteric liquid crystal layer and second cholesteric liquid crystal layer, and the fluorescence band of fluorescence emitted from the dye, overlap in at least a part of the wavelength range.

To generate a laser oscillation with this laser oscillation element, light of shorter wavelength than for example the selective reflection wavelength band in the first and second cholesteric liquid crystal layers is used as the dye excitation light. In the laser oscillation element of the invention, the dye excitation light is arranged to be incident on for example the first cholesteric liquid crystal layer. This excitation light then passes through the first cholesteric liquid crystal layer to be incident on the defect layer, whereupon it excites the dye causing fluorescence so that the laser oscillation can be generated. The laser oscillation element can then generate the laser oscillation with high efficiency. Here, the reason why the laser oscillation is generated with high efficiency may be because the defect layer is composed of an anisotropic medium. According to the laser oscillation element of the invention, continuous wave lasing can also be generated.

In this laser oscillation element, the defect layer preferably contains liquid crystals. In this case, the transition moments of the dye can be aligned by the alignment of the liquid crystals, and the optical emission efficiency can thereby be increased.

In this laser oscillation element, the liquid crystals used in the defect layer are preferably nematic liquid crystals. In this case, unlike the case where the liquid crystals are not nematic liquid crystals, the transition moments of the dye can be aligned parallel within the film surface.

The dye and the nematic liquid crystals are preferably contained within the same layer. In this case, unlike the case where the dye and nematic liquid crystals are contained in different layers, when the liquid crystal molecules are aligned, which interact with the dye molecules so that the dye molecules also become aligned, and the optical emission efficiency is thereby increased.

In this laser oscillation element, the transition moments of the dye and the directors of the nematic liquid crystal are preferably aligned parallel to each other. In this case, unlike the case where the transition moments of the dye and the directors of the nematic liquid crystal are not parallel, the emitted light is linearly polarized.

In this laser oscillation element, for the cholesteric liquid crystals, the wavelength of the optical emission peak in the fluorescence band emitted from the dye preferably lies within the selective reflection wavelength range. In this case, a laser oscillation of higher optical intensity can be generated.

In this laser oscillation element, the dye is preferably an organic dye. In this case, the transition moments are aligned in a fixed direction by the liquid crystals, which offers the advantage that absorption of incident light from a fixed direction is more efficient, and a more efficient fluorescence emission can thus be obtained.

In this laser oscillation element, the first cholesteric liquid crystal layer and second cholesteric liquid crystal layer are preferably disposed such that the directors of the cholesteric liquid crystal in the first cholesteric liquid crystal layer surface on the defect layer side, and the directors of the cholesteric liquid crystal in the second cholesteric liquid crystal layer surface on the defect layer side, are disposed parallel to each other. In this case, the defect layer functions as a discontinuous layer within a continuous helical structure, and the laser oscillation can be generated in the selective reflection wavelength band of the cholesteric liquid crystals.

ADVANTAGES OF THE INVENTION

According to the laser oscillation element of the invention, the transition moments of the dye in the defect layer are aligned parallel to the surfaces of the first cholesteric liquid crystal layer and second cholesteric liquid crystal layer, or the defect layer is composed of an anisotropic medium, so the laser oscillation can be generated with high efficiency. Also, continuous wave lasing can be generated.

DESCRIPTION OF SYMBOLS

1 laser oscillation element, 2 cholesteric liquid crystal layer (first cholesteric liquid crystal layer), 3 cholesteric liquid crystal layer (second cholesteric liquid crystal layer), 4 defect layer, 5 dye, 6 nematic liquid crystal.

BEST MODE FOR CARRYING OUT THE INVENTION

Hereafter, the invention will be described in more detail referring to the attached drawings.

(Laser Oscillation Element)

Figure 1:
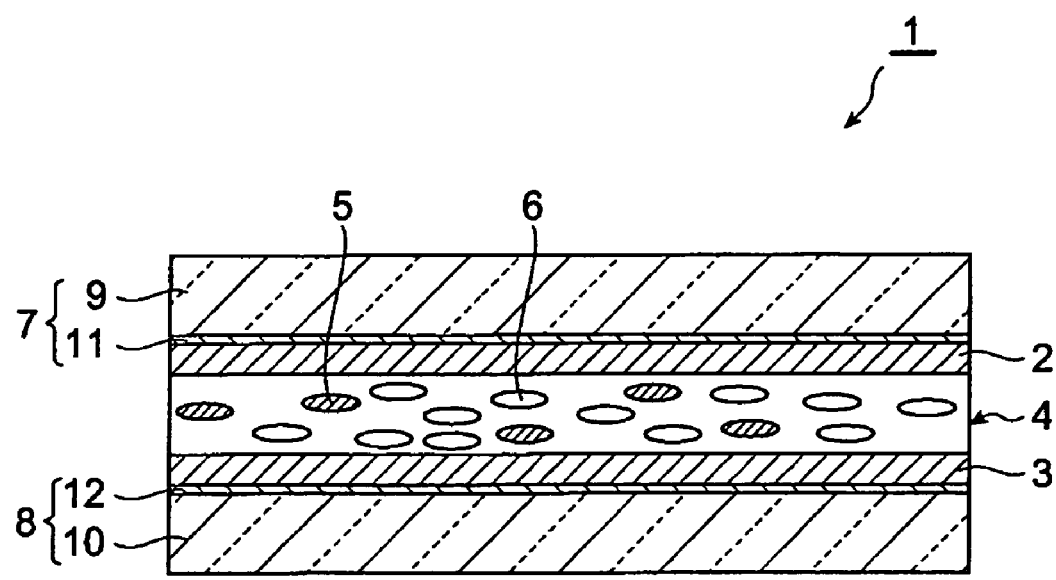
FIG. 1 is a cross-sectional view schematically showing one embodiment of a laser oscillation element according to the invention.

FIG. 1 is a cross-sectional view schematically showing one embodiment of the laser oscillation element of the invention. As shown in FIG. 1, a laser oscillation element 1 comprises a cholesteric liquid crystal layer (first cholesteric liquid crystal layer) 2, and a cholesteric liquid crystal layer (second cholesteric liquid crystal layer) 3, these being disposed facing each other. A defect layer 4 is provided between the cholesteric liquid crystal layers 2, 3.

A transparent alignment substrate 7 is provided on the cholesteric liquid crystal layer 2 on the opposite side to the defect layer 4, and a transparent alignment substrate 8 is provided on the cholesteric liquid crystal layer 3 on the opposite side to the defect layer 4.

The defect layer 4 is composed of anisotropic medium. Here, anisotropic medium means a medium which has anisotropic properties as regards refractive index. The anisotropic medium contains a dye 5 and nematic liquid crystals 6. By providing the dye 5 and nematic liquid crystals 6 in the same layer, unlike the case where they are contained in different layers, the dye molecules can also be aligned by alignment of the liquid crystal molecules. Here, the dye 5 means a dye which can emit fluorescence upon optical excitation, and which has anisotropic properties. Specific examples of the dye 5 are given hereafter.

In the defect layer 4, the directors of the nematic liquid crystals 6 and transition moments of the dye 5 are parallel to each other. In this case, unlike the case where the transition moments of the dye and directors of the nematic liquid crystals are non-parallel, when the liquid crystal molecules are aligned, they interact with the dye molecules so that the dye molecules can also become aligned, and a high optical emission efficiency is obtained. Further, in the defect layer 4, transition moments of the dye 5 are parallel to the surfaces of the cholesteric liquid crystal layers 2, 3.

The cholesteric liquid crystal layer 2 contains cholesteric liquid crystals. In the cholesteric liquid crystals, the directors of the liquid crystal molecules are arranged like a spiral along the thickness direction of the cholesteric liquid crystal layer 2, i.e., along a perpendicular direction to the surface of the cholesteric liquid crystal layer 2. In other words, in the cholesteric liquid crystals, a helical structure is formed by the liquid crystal molecules. Due to this helical structure, the cholesteric liquid crystals can selectively reflect light of a specific wavelength band. These cholesteric liquid crystals have a selective wavelength band which overlaps with the fluorescence band of the fluorescence emitted from the dye 5 in at least a part of the wavelength range. Here, from the viewpoint of generating a laser oscillation of sufficient optical intensity, the peak wavelength of the fluorescence emission band preferably lies within the selective reflection wavelength range. In this embodiment, the winding direction of the spirals of the cholesteric liquid crystals is left-handed. In other words, the spirals of the cholesteric liquid crystals are left-handed spirals. Specific examples of the cholesteric liquid crystals will be given later.

The cholesteric liquid crystal layer 3 contains identical cholesteric liquid crystals to those of the second cholesteric liquid crystal layer 2. In other words, the winding direction of the spirals of the cholesteric liquid crystals of the cholesteric liquid crystal layer 3 is also left-handed. The winding directions of the spirals of the cholesteric liquid crystal layer 2 and cholesteric liquid crystal layer 3 are identical. Therefore, when light is incident on the cholesteric liquid crystal layer 2 and cholesteric liquid crystal layer 3, a part of the incident light is selectively reflected due to the periodic helical structure.

Further, the cholesteric liquid crystal layers 2, 3 are disposed so that the directors of the cholesteric liquid crystals in the surface of the cholesteric liquid crystal layer 2 on the defect layer 4 side and the directors of the cholesteric liquid crystals in the surface of the cholesteric liquid crystal layer 3 on the defect layer 4 side, are parallel to each other. In this case, the defect layer 4 functions as a discontinuous layer within a continuous helical structure, and the laser oscillation can be generated in the selective reflection wavelength range of the cholesteric liquid crystals. Moreover, if the nematic liquid crystals 6 present a nematic liquid crystal phase, the directors of the nematic liquid crystals 6 can also be maintained parallel to the surface of the cholesteric liquid crystal layer 2 or cholesteric liquid crystal layer 3.

(Nematic Liquid Crystals)

The nematic liquid crystals are not particularly limited provided that they can present a nematic liquid crystal phase, and they may comprise polymer liquid crystals or low molecular-weight liquid crystals. As polymer liquid crystals, various main-chain polymer liquid crystal substances, side-chain polymer liquid crystal substances, or mixtures thereof. In the laser oscillation element 1, the reason for using nematic liquid crystals is that, unlike the case where other types of liquid crystal are used, the transition moments of the dye can be aligned parallel within the film surface.

Examples of a main-chain polymer liquid crystal substance are polyesters, polyamides, polycarbonates, polyimides, polyurethanes, polybenzimidazoles, polybenzoxazoles, polybenzothiazoles, polyazomethines, polyester amides, polyester carbonates and polyester imides, or mixtures thereof.

Examples of a side-chain polymer liquid crystal substance are those wherein a mesogenic group is combined with a substance having a straight chain or cyclic backbone, such as polyacrylates, polymethacrylates, polyvinyls, polysiloxanes, polyethers, polymalonates or polyesters, or mixtures thereof.

Examples of a low molecular-weight liquid crystal substance are compounds having liquid crystal properties wherein a reactive functional group is introduced into a terminal group of, for example, a saturated benzene carboxylic acid derivative, unsaturated benzene carboxylic acid derivative, biphenyl carboxylic acid derivative, aromatic oxycarboxylic acid derivative, Schiff base derivative, bisazomethine compound derivative, azo compound derivative, azoxy compound derivative, cyclohexane ester compound derivative or sterol compound derivative, or a composition wherein a crosslining compound is added to any one of the aforesaid compounds exhibiting liquid crystal properties.

(Dye)

The dye 5 is not particularly limited provided that it can emit fluorescence when optically excited and has transition moment anisotropy, and it may be an organic dye or an inorganic dye. Examples of an organic dye are Styryl, Xanthene, Oxazine, Coumarine, Stilben derivatives, Oxazole derivatives, Oxadiazole derivatives or p-oligophenylene derivatives, and the compounds represented by the chemical structure (R=EtH, R'=t-Bu) disclosed in the Journal of the Chemical Society, 2002, No. 124, p. 9760. Examples of an inorganic dye are zinc sulfide, zinc silicide, zinc cadmium sulfide, calcium sulfide, strontium sulfide, calcium tungstanate, Canary glass, platinum cyanide, alkaline earth metal sulfides and rare earth compounds. Among these dyes, an organic dye is particularly preferred. In this case, the dye can be dissolved in a solvent, and by dissolving it in the liquid crystals, the transition moments can be aligned in a fixed direction, the absorption efficiency of light incident from a specific direction can be enhanced, and a highly efficient fluorescence can be obtained.

(Cholesteric Liquid Crystals)

The cholesteric liquid crystals forming the cholesteric liquid crystal layers 2, 3 have a selective reflection wavelength band which overlaps with the fluorescence band emitted from the dye 5 in at least a part of the wavelength range, and at least comprise a liquid crystal substance which permits fixing of cholesteric alignment.

The liquid crystal substance may be a polymer liquid crystal substance or a low molecular-weight liquid crystal substance. Examples of a polymer liquid crystal substance are various main-chain polymer liquid crystal substances, side-chain polymer liquid crystal substances or mixtures thereof.

Examples of a main-chain polymer liquid crystal substance are polyesters, polyamides, polycarbonates, polyimides, polyurethanes, polybenzimidazoles, polybenzoxazoles, polybenzothiazoles, polyazomethines, polyester amides, polyester carbonates or polyester imides, or mixtures thereof.

Examples of a side-chain polymer liquid crystal substance are those wherein a mesogenic group is combined with a substance having a backbone of straight chain or cyclic structure, such as polyacrylates, polymethacrylates, polyvinyls, polysiloxanes, polyethers, polymalonates or polyesters, or mixtures thereof.

Among these, from the viewpoint of ease of synthesis and alignment, a main-chain polymer liquid crystal substance is preferred, and among these, a polyester is particularly preferred.

As the polymer structural unit, for example an aromatic or aliphatic diol unit, an aromatic or aliphatic dicarboxylic acid unit, or an aromatic or aliphatic hydroxycarboxylic acid unit is preferably used.

Examples of a low molecular-weight liquid crystal substance are compounds having liquid crystal properties wherein a reactive functional group is introduced into a terminal group of, for example, a saturated benzene carboxylic acid derivative, unsaturated benzene carboxylic acid derivative, biphenyl carboxylic acid derivative, aromatic oxycarboxylic acid derivative, Schiff base derivative, bisazomethine compound derivative, azo compound derivative, azoxy compound derivative, cyclohexane ester compound derivative or sterol compound derivative, or a composition wherein a crosslinking compound is added to any one of the aforesaid compound derivatives exhibiting liquid crystal properties.

The method of forming the cholesteric liquid crystal layers 2, 3 may be any method known in the art. The cholesteric liquid crystal layers 2, 3 can be obtained by forming an alignment film on a transparent substrate, performing rubbing treatment of the alignment film, coating a liquid crystal substance having the aforesaid cholesteric liquid crystals as an essential ingredient, and performing heat treatment.

(Alignment Substrate)

The alignment substrates 7, 8 are not particularly limited provided that they are transparent to the excitation light and fluorescence light of the dye 5, and can support the cholesteric liquid crystal layers 2, 3. Examples of the alignment substrates 7, 8 are films made of polyimide, polyamide, polyamide-imide, polyphenylene sulfide, polyphenylene oxide, polyether-ketone, polyetheretherketone, polyethersulfone, polysulfone, polyethylene terephthalate, polyethylene naphthalate, polyalylate, triacetylcellulose, epoxy resin and phenolic resins, or uniaxially stretched films thereof Depending on the manufacturing process, these films may have sufficient directional properties with respect to the cholesteric liquid crystals used for the cholesteric liquid crystal layers 2, 3 even if no special treatment to confer directionality is performed, but if the directionality is insufficient or there is no directionality, directionality may be conferred by various treatments if required, e.g., stretching the film with appropriate heating, performing a so-called rubbing treatment in which the film surface is rubbed in one direction with a rayon cloth or the like, covering the film with an alignment firm of an alignment agent known in the art such as a polyimide, polyvinyl alcohol or silane coupling agent and performing the rubbing treatment, performing an oblique angle vapor deposition treatment with silicon oxide or the like, or by combining these treatments as may be required. Alternatively, various types of glass plate or the like having regular microgrooves on the surface may also be used as the alignment substrates 7, 8.

The alignment substrates 7, 8 preferably comprise rubbed polyimide films 11, 12 formed on transparent substrates 9, 10.

(Method of Manufacturing Laser Oscillation Element)

The laser oscillation element 1 can be manufactured as follows.

First, the transparent alignment substrates 7, 8 are prepared. The alignment substrates 7, 8 may be for example a glass plate on which a rubbed alignment film is formed.

Next, the cholesteric liquid crystals forming the cholesteric liquid crystal layers 2, 3 are mixed with a solvent to prepare a liquid crystal solution of predetermined concentration, and this liquid crystal solution is coated on the film of the alignment substrates 7, 8. In this process, the cholesteric liquid crystals become aligned. At this time, if required, the alignment of the cholesteric liquid crystals is formed by heat treatment or the like. The heat treatment aligns the liquid crystals by the inherent self-organizing ability of the liquid crystal substance when they heated within the liquid crystal phase temperature range. The heating conditions cannot be uniquely defined since the optimum conditions and critical values differ according to the liquid crystal phase behavior temperature (transition temperature) of the liquid crystal substance used, but it is normally a range of 10-300° C., and preferably 30-250° C. If the temperature is too low, the alignment of the liquid crystals may not proceed satisfactorily, and if it is too high, the liquid crystal substance may decompose or the alignment substrate may affect adversely. The heat treatment time is normally 3 seconds-60 minutes, but preferably 10 seconds-30 minutes. If the heat treatment time is shorter than 3 seconds, alignment of the liquid crystals may not be satisfactorily completed, and if it exceeds 60 minutes, productivity is severely affected, so any case is not preferable.

The solvent in the aforesaid liquid crystal solution depends on the type of cholesteric liquid crystals used, but it is usually a hydrocarbon such as toluene, xylene, butylbenzene, tetrahydronaphthalene and decahydronaphthalene, an ether such as ethylene glycol dimethyl ether, diethyleneglycoldimethylether, propylene glycol dimethyl ether and tetrahydrofuran, a ketone such as methylethyl ketone, methyl isobutyl ketone and cyclohexanone, an ester such as ethyl acetate, butyl acetate, ethylene glycol monomethyl ether acetate, propylene glycol methyl ether acetate, ethyl lactate and γ-butyrolactone, N-methyl-2-pyrrolidone, an amide such as dimethylformamide and dimethyl acetamide, a halogenated hydrocarbon such as dichloromethane, carbon tetrachloride, tetrachloroethane and chlorobenzene, or an alcohol such as butyl alcohol, triethylene glycol, diacetone alcohol and hexylene glycol. These solvents may conveniently be blended together as required. The concentration of the solution cannot be uniquely determined since it differs depending on the molecular weight and solubility of the cholesteric liquid crystals, as well the thickness of the cholesteric liquid crystal layers 2, 3 which it is finally desired to obtain, but it is normally 1-60 mass % and preferably 3-40 mass %.

The liquid crystal solution may further contain a surfactant in order to facilitate coating, examples of this surfactant being a cationic surfactant such as a imidazoline, quartemary ammonium salt, alkylamine oxide or polyamine derivative, an anionic surfactant such as polyoxyethylene-polyoxypropylene condensate, a primary or secondary alcohol ethoxylate, an alkylphenol ethoxylate, polyethylene glycol and its esters, sodium lauryl sulfate, ammonium lauryl sulfate, amine lauryl sulfate, an alkyl-substituted aromatic sulfonate, an alkyl phosphate, an aliphatic or aromatic sulfonic acid formalin condensate, an amphoteric surfactant such as laurylamide propylbetaine or laurylamino betaine acetate, a nonionic surfactant such as a polyethylene glycol fatty acid ester or polyoxyethylenealkylamine, or a fluorinated surfactant such as a perfluoroalkylsulfonate, perfluoroalkylcarbonate, perfluoroalkyl ethylene oxide adduct, perfluoroalkyltrimethylammonium salt, an oligomer containing a perfluoroalkyl and hydrophilic group, an oligomer containing a perfluoroalkyl and lipophilic group, or a urethane containing a perfluoroalkyl group.

The addition amount of surfactant depends on the type of surfactant and the solvent or the alignment film of the alignment substrates 7, 8 to be coated, but it is usually within the range of 10 ppm-10%, preferably 50 ppm-5% and more preferably 0.01%-1% relative to the weight of cholesteric liquid crystals.

A crosslinking agent such as a bis-azide compound or glycydyl methacrylate may be added to the aforesaid liquid crystal solution in order to improve heat resistance of the cholesteric liquid crystal layers 2, 3 to the extent that it does not interfere with the appearance of the cholesteric liquid crystal phase, and a crosslinking may be performed by a process described later. The cholesteric phase may also be appeared and a crosslinking may be performed by introducing a polymerizable functional group having a biphenyl derivative, phenyl benzoate derivative or stilbene derivative containing an acryloyl group, vinyl group or epoxy group as its basic skeleton into the liquid crystal substance beforehand.

The method of coating the liquid crystal solution is not particularly limited provided that uniformity of the coating film can be ensured, and any method known in the art may be used. For example, roll coating, die coating, dip coating, curtain coating and spin coating may be mentioned. After coating, a solvent removal (drying) step using a heater or hot air blower, or the like may be introduced. The thickness of the coated film in the dry state is normally 0.3-20 μm, preferably 0.5-10 μm and more preferably 0.7-3 μm. Outside this range, the optical performance of the cholesteric liquid crystal layers 2, 3 obtained may be poor, and the alignment of the cholesteric liquid crystals may be insufficient.

After forming the alignment of the cholesteric liquid crystals, fixing of the alignment is performed. In this case, after alignment of the cholesteric liquid crystals is completed by heat treatment or the like, the cholesteric liquid crystals on the alignment substrates 7, 8 are fixed in that state using a means suitable for the cholesteric liquid crystals. Examples of such means are glass fixing by rapid cooling, and crosslinking by irradiation of energy such as heat, ultraviolet radiation or an electron beam.

Next, to make the cholesteric liquid crystal layers 2, 3 face inwards, the alignment substrates 7, 8 are connected together via spacers, not shown. The alignment substrates 7, 8 are then connected together so that the directors of the cholesteric liquid crystals in the inner surface of the cholesteric liquid crystal layer 2, and the directors of the cholesteric liquid crystals in the inner surface of the cholesteric liquid crystal layer 3, are parallel.

A solution obtained by a mixing of the nematic liquid crystals 6 and dye 5 is with a solvent then prepared, this solution is fills in the space between the alignment substrates 7, 8 by making use of the capillary phenomenon, and the solution is heated to remove the solvent. The defect layer 4 between the cholesteric liquid crystal layers 2, 3 is thus obtained. Since the directors of the cholesteric liquid crystals in the inner surface of the cholesteric liquid crystal layer 2 and the directors of the cholesteric liquid crystals in the inner surface of the cholesteric liquid crystal layer 3 are parallel, when the nematic liquid crystals 6 express the nematic liquid crystal phase, their directors are aligned in a direction parallel to the surfaces of the alignment substrates 7, 8. In this way, the laser oscillation element 1 is obtained.

In the aforesaid manufacturing method, connecting the cholesteric liquid crystal layers 2, 3 via spacers, sealing the solution, and then removing the solvent thereby to orient the nematic liquid crystals 6 and to form the defect layer 4 between the cholesteric liquid crystal layers 2, 3. However, if the alignments of the dye 5 and nematic liquid crystals 6 are fixed and the defect layer 4 has already been manufactured beforehand, i.e., when the defect layer 4 is a polymer film, the cholesteric liquid crystal layer 2, defect layer 4 and cholesteric liquid crystal layer 3 may be laminated together using adhesive or the like.

(Operation of Laser Oscillation Element)

Next, the operation of the laser oscillation element 1 will be described.

To generate the laser oscillation in the laser oscillation element 1, for example light of shorter wavelength than the selective reflection wavelength band in the cholesteric liquid crystal layers 2, 3 may be used as the excitation light of the dye 5.

To generate the laser oscillation in the laser oscillation element 1, this excitation light is arranged to be incident on for example the cholesteric liquid crystal layer 2. The excitation light then passes through the cholesteric liquid crystal layer 2 to be incident on the defect layer 4, whereupon it excites the dye 5 causing fluorescence so that the laser oscillation can be generated. The laser oscillation element 1 can then generate the laser oscillation with high efficiency. In other words, the laser oscillation element 1 emits a sufficiently intense laser light even if its thickness is small. Moreover, according to the laser oscillation element 1, continuous wave lasing can also be generated.

Here, it is the opinion of the Inventors that the laser oscillation is generated with high efficiency because, in the defect layer 4, since the transition moments of the dye are aligned parallel to the surfaces of the cholesteric liquid crystal layers 2, 3, the absorption efficiency of the dye 5 and efficiency of extracting the fluorescence become sufficiently high, or alternatively, because the defect layer 4 is composed of an anisotropic medium.

In the aforesaid embodiments, the winding directions of the spirals of the cholesteric liquid crystals in the cholesteric liquid crystal layers 2, 3 are left-handed, but provided that the winding directions of the spirals of the cholesteric liquid crystals in the cholesteric liquid crystal layers 2, 3 are identical, they may be right-handed.

The laser oscillation element of the invention is not limited to the construction of the aforesaid laser oscillation element 1. For example, in the laser oscillation element 1, the dye 5 is contained in the defect layer 4, but if the defect layer 4 is composed of an anisotropic medium, the dye 5 may be contained in at least one layer selected from among the cholesteric liquid crystal layer 2, cholesteric liquid crystal layer 3 and defect layer 4. Therefore, in the laser oscillation element 1, if it is contained in either the cholesteric liquid crystal layer 2 or the cholesteric liquid crystal layer 3, the dye 5 does not need to be contained in the remaining layers. In this case, the nematic liquid crystals 6 are not necessarily contained in the same layer as a layer containing the dye 5, and the dye 5 and nematic liquid crystals 6 may be contained in different layers. In the laser oscillation element 1, if the dye 5 is contained in both the cholesteric liquid crystal layer 2 and cholesteric liquid crystal layer 3, the dye 5 does not need to be contained in the defect layer 4. The dye 5 may also be contained in all of the cholesteric liquid crystal layer 2, cholesteric liquid crystal layer 3 and defect layer 4.

The transition moments of the dye 5 are aligned parallel to the surfaces of the cholesteric liquid crystal layers 2, 3, but if the defect layer is composed of an anisotropic medium, the transition moments of the dye 5 may be aligned randomly within the defect layer 4.

In the aforesaid embodiment, the defect layer 4 is composed of a material containing the dye 5 and nematic liquid crystals 6, but in the laser oscillation element of the invention, if the defect layer 4 is composed of an anisotropic medium, the defect layer 4 is not limited to a material containing the dye 5 and nematic liquid crystals 6. Therefore, instead of the material containing the dye 5 and nematic liquid crystals 6, a uniaxial or biaxial optical medium, e.g., an extended plastic film of polyethylene terephthalate, polycarbonate, norbornene or polyvinyl alcohol, uniaxial crystals such as quartz or calcite, or biaxial crystals such as mica and gypsum, may also be used.

In the aforesaid embodiments, the defect layer 4 contains not only the dye 5 but also nematic liquid crystals 6, but if the transition moments of the dye 5 are aligned parallel to the surfaces of the cholesteric liquid crystal layers 2, 3, the defect layer 4 does not need to contain the nematic liquid crystals 6. In this case, instead of the nematic liquid crystals 6, the defect layer 4 may contain a liquid crystal material such as smectite liquid crystals or cholesteric liquid crystals, or a plastic material such as polycarbonate, polystyrene, cycloolefin polymer, polyethylene terephthalate, polysulfone, acrylic resin or urethane resin.

EXAMPLES

Next, the invention will be described more concretely using examples, but the invention is not limited to the examples.

Example 1

First, a polymeric cholesteric liquid crystal solution was prepared using a liquid crystal mixture (LC film, made by Nippon Oil Corporation) of polymeric achiral nematic liquid crystals composed of an aromatic polyester with polymeric chiral nematic liquid crystals composed of an aromatic polyester dissolved in chloroform. Here, the blending ratio of the polymeric chiral nematic liquid crystals in the liquid crystal mixture was 93 wt % and the concentration of the mixture in the polymeric cholesteric liquid crystal solution was 10 wt %.

This polymeric cholesteric liquid crystal solution was spin-cast on a glass substrate having a polyimide alignment film (1254, made by JSR) rubbed in one direction, and hardened for 2 minutes by heating the cholesteric liquid crystal solution to 180° C. Thus, a well-aligned polymeric cholesteric liquid crystal (PCLC) film having a thickness of approximately 1.8 µm was thereby obtained. At this time, the helical axis of the PCLC film was perpendicular to the surface of the glass substrate. This PCLC film was identical to the LCP film made by Nippon Oil Corporation.

Next, two PCLC films were connected via polyethylene terephthalate (PET) spacers of thickness 12.5 µm so that the directors of the cholesteric liquid crystals in the surface were aligned parallel to each other and the PCLC films were facing inward.

On the other hand, a dye-doped NLC solution was prepared by blending a low molecular-weight mixture of commercial nematic liquid crystals (NLC) (ZLI2293, made by Merck) and a fluorescent polymer dye (in the chemical structural formula (R=EtH, R'=t–Bu) given in the Journal of the Chemical Society, 2002, No. 124, p. 9670, number average molecular weight is 1800 and weight average molecular weight Mw/number average molecular weight Mn=2) with chloroform. At this time, the concentration of polymer dye in the NLC was adjusted to 2 wt %.

Then, the dye-doped NLC solution was introduced in the space between the PCLC films by making use of the capillary phenomenon, and the chloroform was evaporated at 70° C. to form a defect layer. Thus, a laser oscillation element having a thickness of 16.1 µm was thereby obtained.

Example 2

A laser oscillation element was obtained in a manner similar to that of Example 1, except that the chiral nematic blending ratio in the liquid crystal mixture was 92 wt %, and the thickness of the laser oscillation element was adjusted to 9.6 µm by changing the thickness of the defect layer to 6 µm.

Example 3

A laser oscillation element was obtained in a manner similar to that of Example 1, except that the chiral nematic blending ratio in the liquid crystal mixture was 87 wt %, and the thickness of the laser oscillation element was adjusted to 5.6 µm by changing the thickness of the defect layer to 2 µm.

Example 4

A laser oscillation element was obtained in a manner similar to that of Example 1, except that the thickness of the laser oscillation element was adjusted to 2 µm.

Comparative Example 1

A laser oscillation element was obtained in a manner similar to that of Example 1, except that one of the two PCLC films and the defect layer were omitted.

(Measurement of Fluorescence Spectrum, Reflection Spectrum and Laser Oscillation)

For the laser oscillation element obtained in Examples 1-3, the fluorescence spectrum, reflection spectrum and laser oscillation were measured. The results are shown in (a)-(c) of FIG. 2. In (a)-(c) of FIG. 2, the dashed line shows the fluorescence spectrum, the dot-and-dash line shows the reflection spectrum and the solid line shows the laser oscillation.

The fluorescence spectrum and laser oscillation were measured using a 435 nm pulsed laser beam emitted by an optical parametric oscillator (OPO) as excitation source. The third harmonic emitted by a Nd:YAG laser was used for excitation of the OPO.

The excitation light was arranged to be incident obliquely (approximately 30°) to the surface of the glass substrate of the laser oscillation element. The optical emission from the laser oscillation element was detected by a multi-channel spectrometer (USB 2000, made by Ocean Optics) by a lens disposed in front of the glass substrate, i.e., on a line normal to the surface of the glass substrate.

The reflection spectrum was measured by a microscope spectrometer (TFM-120AFT-PC, made by ORC).

Figure 2:
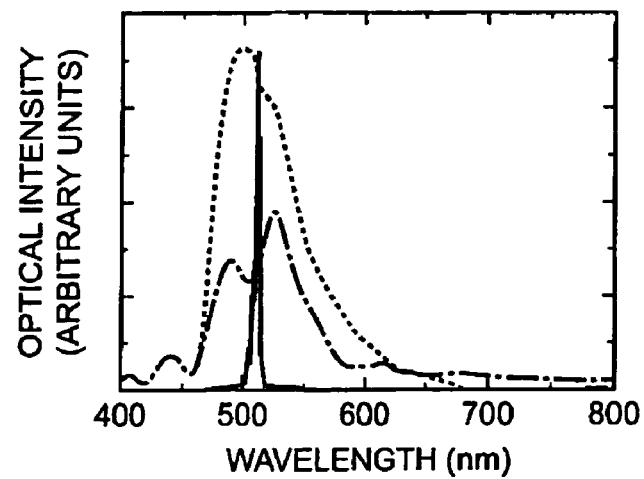
FIG. 2 are graphs showing the results of fluorescence spectra, reflection spectra and laser oscillation measured for the laser oscillation element of Examples 1-3.
Figure 2:
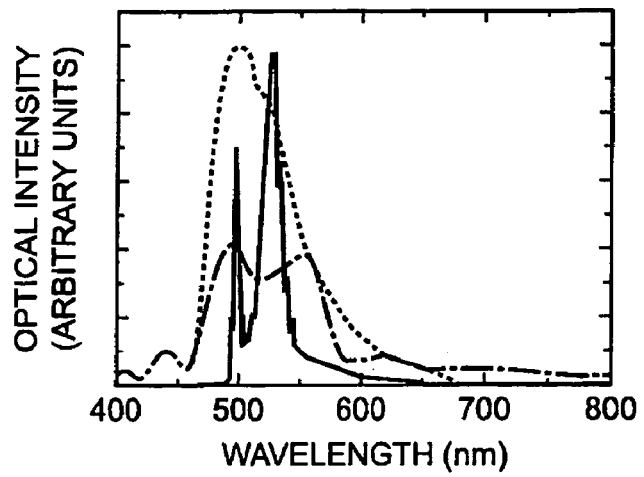
Figure 2:
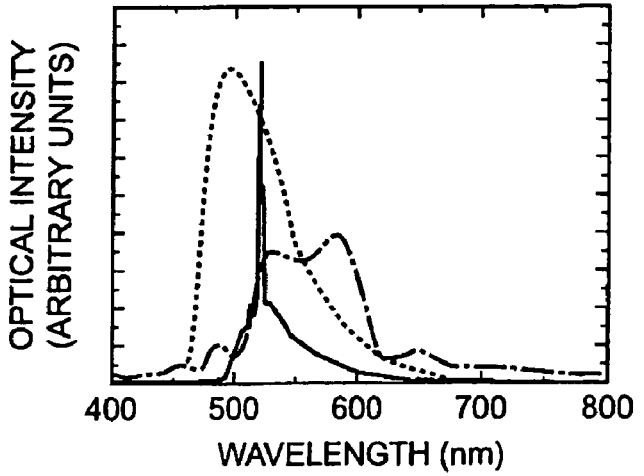

From the results shown in (a)-(c) of FIG. 2, it was found that in the defect layer between the PCLC films, when the transition moments of the dye were aligned parallel to the surface of the PCLC films (when the defect layer between the PCLC films was composed of an anisotropic medium), a high intensity laser oscillation was observed in spite of the thickness of the laser oscillation element was very small.

In the laser oscillation element of Example 1, as shown in (a) of FIG. 2, the reflection spectrum overlaps with the fluorescence spectrum, the laser oscillation wavelength (optical emission peak wavelength) was 508 nm, and FWHM (Full Width of Half Maximum) was approximately 3 nm. In the laser oscillation element of Example 2, as shown in (b) of FIG. 2, the reflection spectrum was slightly offset from the fluorescence spectrum, the laser oscillation wavelength due to the defect layer among the two laser oscillation wavelengths (wavelength on the longer wavelength side) was 523 nm, and FWHM was 15 nm or less. Further, in the laser oscillation element of Example 3, as shown in (c) of FIG. 2, the reflection spectrum was offset from the fluorescence spectrum, the laser oscillation wavelength was 520 nm, and FWHM was 2.5 nm, but the skirt portion of the emission peak was broad.

Figure 3:
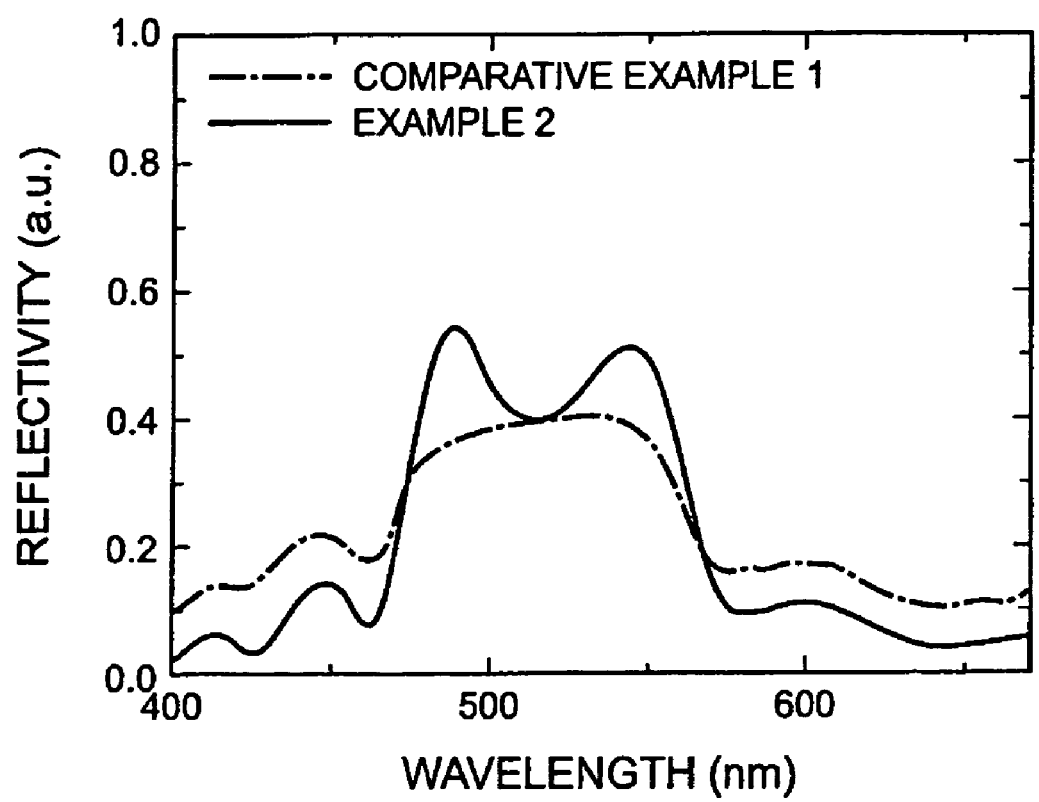
FIG. 3 is a graph showing the reflection spectra of the laser oscillation element according to Example 2 and Comparative Example 1.

For the laser oscillation element obtained in Comparative Example 1, the reflection spectrum was measured in a manner similar to that of Example 1, and compared with the results of the reflection spectrum for the laser oscillation element of Example 2. The results were shown in FIG. 3. In FIG. 3, the solid line shows Example 2 and the dot-and-dash line shows Comparative Example 2.

From the results shown in FIG. 3, it is seen that the reflectivity of the laser oscillation element of Example 2 is much larger than the reflectivity of the laser oscillation element of Comparative Example 1, and in the reflection spectrum of Example 2, at a certain wavelength, the reflectivity considerably exceeds 50%.

In the reflection spectrum, selective reflection due to the cholesteric liquid crystals generally contributes to the high reflectivity part. Selective reflection is a reflection wherein 50% of the circularly polarized light in the incident light is reflected, the remaining 50% of the circularly polarized light being transmitted. Hence, if the reflectivity exceeds 50%, it means that in the laser oscillation element of Example 2, there must be a structural component which increases the intensity of the reflected light.

To investigate the structural component which increases the reflective light intensity in the laser oscillation element of Example 2, a simulation test was performed on the reflection spectra of the following three types of laser oscillation element using a Cybernet Systems, Inc., MATLAB 6.1.

(1) Laser oscillation element comprising only single cholesteric liquid crystal film (2) Laser oscillation element with isotropic defect layer between two cholesteric liquid crystal films (3) Laser oscillation element with anisotropic defect layer between two cholesteric liquid crystal films.

Here, the simulation conditions were set as follows:

(1) Cholesteric liquid crystal film:

$n_e$=1.63, $n_o$=1.5

Thickness=1.35 µm

Helical pitch=510 nm (2) Isotropic defect layer:

$n_e$=1.56, $n_o$=1.56

Thickness 1.2 µm (3) Anisotropic defect layer:

$n_e$=1.66, $n_o$=1.5

Thickness=1.2 µm

In (1)-(3), $n_e$ is the refractive index for extraordinary light, and $n_o$ is the refractive index for ordinary light.

Figure 4:
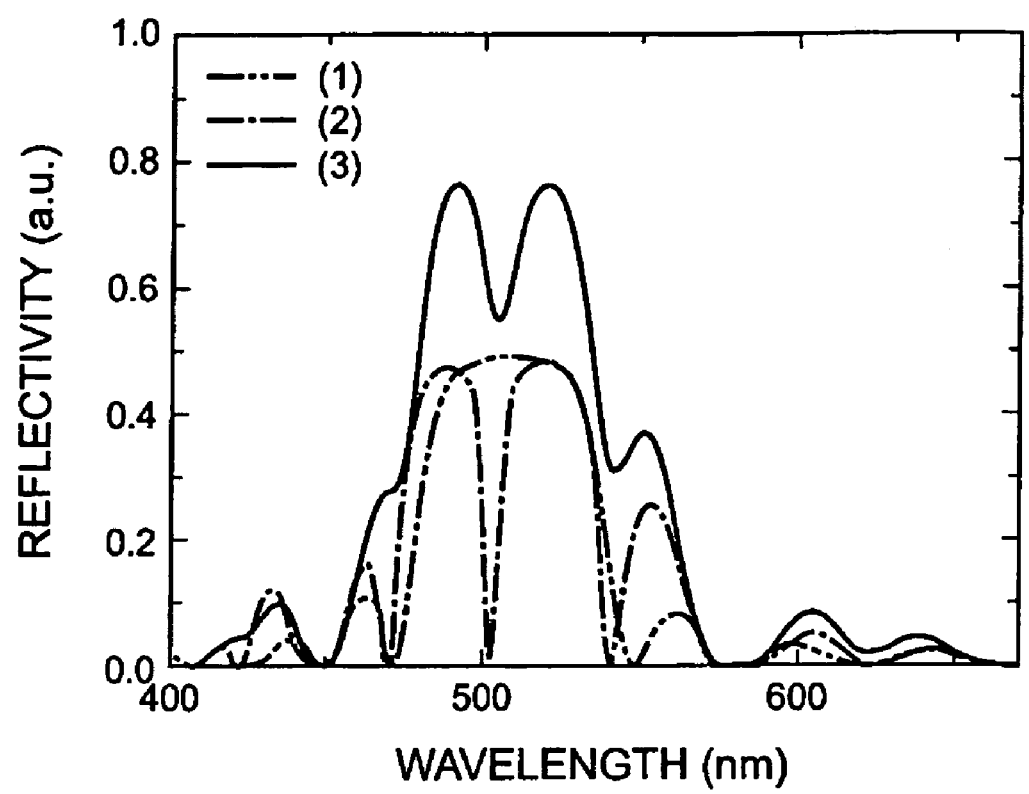
FIG. 4 is a graph showing simulation results for the reflection spectra of three kinds of laser oscillation elements having different constructions.

FIG. 4 shows the results of the simulation test. In FIG. 4, the solid line corresponds to (3), the dot-and-dash line corresponds to (2), and the chain double dashed line corresponds to (1).

From the results of FIG. 4, it is seen that the reflectivity in the selective reflection band is much larger for the laser oscillation element (3) than for the laser oscillation elements (1) and (2). This suggests that using the defect layer comprising an anisotropic medium contributes to increasing the reflectivity.

From the results of Examples 1-3, it was found that according to the laser oscillation element of the invention, a laser oscillation could be generated with high efficiency by arranging the transition moments of the dyes in the defect layer between the PCLC films to be aligned parallel to the surfaces of the PCLC films, or by using the defect layer comprising an anisotropic medium.

It was also found that, to generate a laser oscillation having a sharp emission peak, overlapping between the reflection spectrum (selective reflection wavelength band) and the fluorescence spectrum (fluorescence band) is important.

Next, to examine the minimum value (threshold value) of incident energy required for laser oscillation for the laser oscillation element obtained in Example 4, the excitation source was changed to a 442 nm continuous wave emitted by a He—Cd (helium-cadmium) laser.

A rotating neutral density filter was installed immediately after the emission outlet of the He—Cd laser so that the incident energy (light amount) on the laser oscillation element could be continuously adjusted.

The excitation light which passed through the above neutral density filter was arranged to be incident obliquely (approximately 30°) on the surface of the glass substrate of the laser oscillation element. The optical emission from the laser oscillation element was detected by a multi-channel spectrometer (USB 2000, made by Ocean Optics) by a lens disposed in front of the glass substrate, i.e., on a line normal to the surface of the glass substrate.

Figure 5:
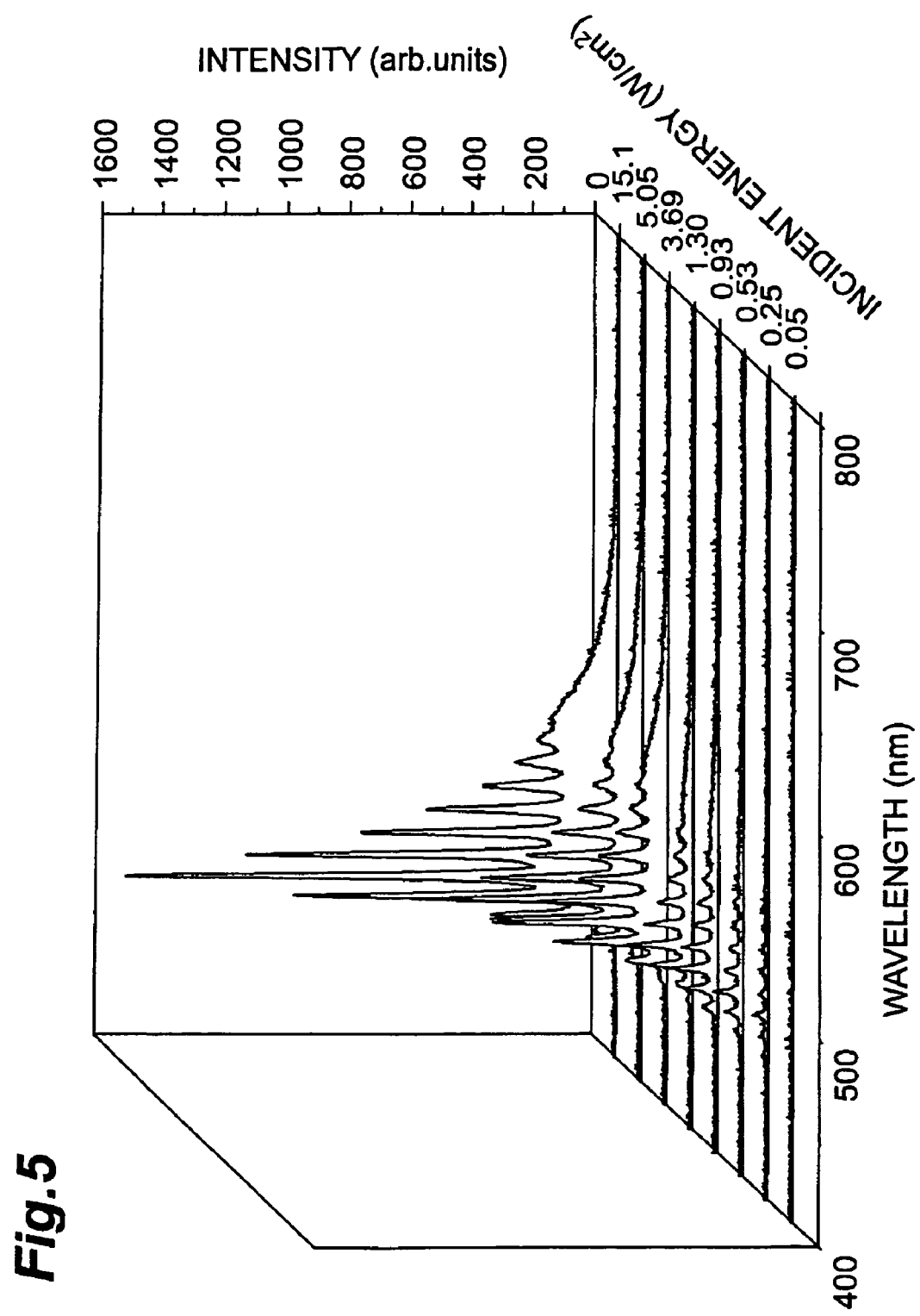
FIG. 5 is a graph showing an emerging light spectrum relative to incident energy for the laser oscillation element of Example 4.
Figure 6:
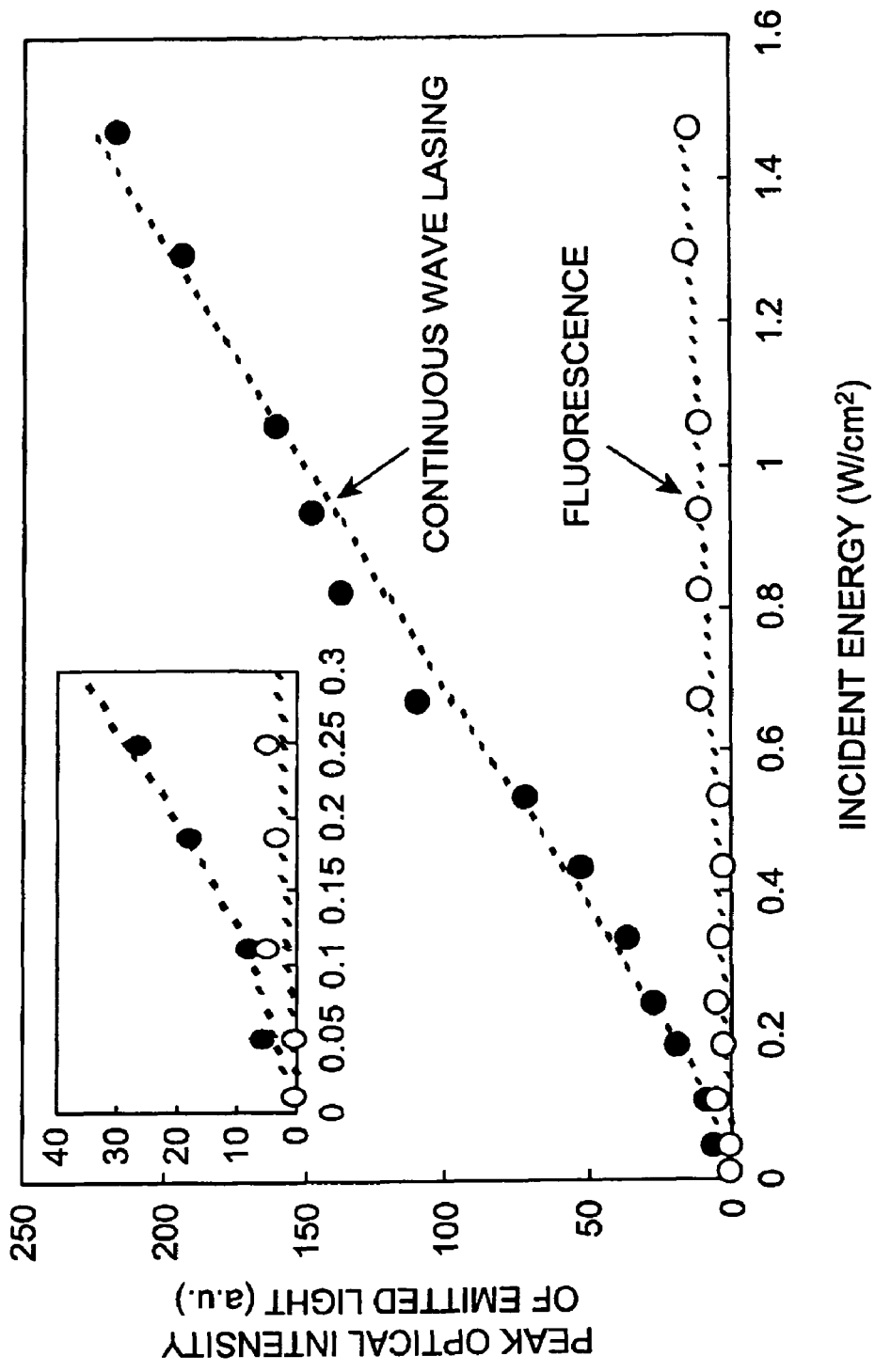
FIG. 6 is a graph showing a relation between incident light and emerging light peak intensity for the laser oscillation element of Example 4.

FIG. 5 shows the optical emission spectrum relative to incident energy, and FIG. 6 shows the relation between the incident energy and the light intensity of maximum peak in optical emission from the laser oscillation element. The small graph shown in FIG. 6 is a graph showing the variation of the light intensity of maximum peak in the range where the incident energy is low on a larger scale, then showing in expanded scale. The unit of horizontal axis is W/cm$^2$, and the unit of vertical axis is arbitrary unit.

From FIG. 6, it was found that there is a substantially linear relationship between the incident energy and emission light, and in particular, since there are characteristic laser emission peaks in the emitted light even in the low-energy range where the incident energy is less than 0.1 W/cm$^2$, there is substantially no threshold value of the incident energy, and continuous wave lasing can be generated.

The invention claimed is:

1. A laser oscillation element, comprising:
  a first cholesteric liquid crystal layer containing cholesteric liquid crystals;
  a second cholesteric liquid crystal layer containing cholesteric liquid crystals facing said first cholesteric liquid crystal layer;
  a defect layer containing a dye which emits fluorescence upon optical excitation disposed between said first cholesteric liquid crystal layer and said second cholesteric liquid crystal layer;
  a first alignment substrate provided on the first cholesteric liquid crystal layer on the opposite side to the defect layer; and
  a second alignment substrate provided on the second cholesteric liquid crystal layer provided on the opposite side to the defect layer,
  wherein the first and second alignment substrates each comprises an alignment film composed of a material selected from a polyamide, a polyvinyl alcohol or a silane coupling agent;
  the selective reflection wavelength band in said cholesteric liquid crystals and the fluorescence emission band of the fluorescence emitted from said dye overlap with each other in at least a part of the wavelength range;
  the helical winding directions of the cholesteric liquid crystals in said first cholesteric liquid crystal layer and said second cholesteric liquid crystal layer are identical;
  the transition moments of said dye are parallel to the surfaces of said first cholesteric liquid crystal layer and said second cholesteric liquid crystal layer,
  said defect layer is composed of an anisotropic medium, and said first cholesteric liquid crystal layer and said second cholesteric liquid crystal layer are aligned such that the directors of the cholesteric liquid crystals in the surface on the defect layer side of said first cholesteric liquid crystal layer, and the directors of the cholesteric liquid crystals in the surface on the defect layer side of said second cholesteric liquid crystal layer, are parallel to each other.

2. The laser oscillation element according to claim 1, wherein said defect layer contains liquid crystals.

3. The laser oscillation element according to claim 2, wherein said liquid crystals are nematic liquid crystals.

4. The laser oscillation element according to claim 3, wherein the transition moments of said dye and the directors of said nematic liquid crystals are aligned parallel to each other.

5. The laser oscillation element according to claim 3, wherein said dye is contained in the same layer as the nematic liquid crystals.

6. The laser oscillation element according to claim 5, wherein said dye is an organic dye.

7. The laser oscillation element according to claim 3, wherein said dye is an organic dye.

8. The laser oscillation element according to claim 4, wherein said dye is an organic dye.

9. The laser oscillation element according to claim 2, wherein said dye is an organic dye.

10. The laser oscillation element according to claim 9, wherein the transition moments of said dye and the directors of said nematic liquid crystals are aligned parallel to each other.

11. The laser oscillation element according to claim 1, wherein said cholesteric liquid crystals have a wavelength at an emission peak in an emission band of the fluorescence emitted from said dye in the selective reflection wavelength band.

12. The laser oscillation element according to claim 11, wherein the transition moments of said dye and the directors of said nematic liquid crystals are aligned parallel to each other.

13. A laser oscillation element, comprising:
a first cholesteric liquid crystal layer containing cholesteric liquid crystals;
a second cholesteric liquid crystal layer containing cholesteric liquid crystals facing said first cholesteric liquid crystal layer; and
a defect layer composed of an anisotropic medium disposed between said first cholesteric liquid crystal layer and said second cholesteric liquid crystal layer;
a first alignment substrate provided on the first cholesteric liquid crystal layer on the opposite side to the defect layer; and
a second alignment substrate provided on the second cholesteric liquid crystal layer provided on the opposite side to the defect layer,
wherein the first and second alignment substrates each comprises an alignment film composed of a material selected from a polyamide, a polyvinyl alcohol or a silane coupling agent;
the helical winding directions of the cholesteric liquid crystals in said first cholesteric liquid crystal layer and said second cholesteric liquid crystal layer are identical;
a dye which emits fluorescence upon optical excitation is contained in at least one of said first cholesteric liquid crystal layer, said defect layer and said second cholesteric liquid crystal layer;
the selective reflection wavelength band in said first cholesteric liquid crystal layer and said second cholesteric liquid crystal layer, and the fluorescence emission band of the fluorescence emitted from said dye, overlap in at least part of the wavelength range, and
said first cholesteric liquid crystal layer and said second cholesteric liquid crystal layer are aligned such that the directors of the cholesteric liquid crystals in the surface on the defect layer side of said first cholesteric liquid crystal layer, and the directors of the cholesteric liquid crystals in the surface on the defect layer side of said second cholesteric liquid crystal layer, are parallel to each other.

14. The laser oscillation element according to claim 13, wherein said defect layer contains liquid crystals.

15. The laser oscillation element according to claim 14, wherein said liquid crystals are nematic liquid crystals.

16. The laser oscillation element according to claim 13, wherein said cholesteric liquid crystals have a wavelength at an emission peak in an emission band of the fluorescence emitted from said dye in the selective reflection wavelength band.

* * * * *